United States Patent
Shohi et al.

(10) Patent No.: US 6,383,647 B1
(45) Date of Patent: May 7, 2002

(54) INTERMEDIATE FILM FOR LAMINATED GLASS AND LAMINATED GLASS

(75) Inventors: Hajime Shohi, Shiga; Tsuyoshi Hattori, Mie; Jiro Miyai, Shiga, all of (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/555,268

(22) PCT Filed: Sep. 9, 1999

(86) PCT No.: PCT/JP99/05383

§ 371 Date: Aug. 2, 2000

§ 102(e) Date: Aug. 2, 2000

(87) PCT Pub. No.: WO00/18698

PCT Pub. Date: Apr. 6, 2000

(30) Foreign Application Priority Data

Sep. 30, 1998 (JP) ............................................ 10-277447
Feb. 18, 1999 (JP) .............................................. 11-40047

(51) Int. Cl.⁷ .......................... B32B 17/10; C03C 27/12; C08L 29/14
(52) U.S. Cl. ........................ 428/437; 428/436; 524/306; 524/394; 524/400
(58) Field of Search ................................ 428/436, 437; 524/306, 394, 400

(56) References Cited

U.S. PATENT DOCUMENTS

| | | | |
|---|---|---|---|
| 4,230,771 A | * 10/1980 | Phillips | 428/437 |
| 4,952,457 A | * 8/1990 | Cartier et al. | 428/425.6 |
| 5,434,207 A | * 7/1995 | Fischer | 524/270 |
| 5,728,472 A | * 3/1998 | D'Errico | 428/437 |

FOREIGN PATENT DOCUMENTS

| | | | |
|---|---|---|---|
| EP | 0 457 190 A1 | 5/1991 | ........... B32B/27/30 |
| EP | 1 022 261 A1 | 3/1998 | ........... C03C/27/12 |
| JP | 10-139497 | 5/1998 | |
| JP | 10-245246 | 9/1998 | |
| WO | 96/28504 | 3/1995 | ............. C08K/5/06 |

OTHER PUBLICATIONS

Abstract—Database WPI Section Ch, Week 198018, Derwent Publications Ltd., London, GB; AN 1980–31559C; XP002164180 & J55037420 A (Sekisui Chemical Co Ltd) Mar. 15, 1980.

* cited by examiner

Primary Examiner—D. S. Nakarani
(74) Attorney, Agent, or Firm—Sughrue Mion, PLLC

(57) ABSTRACT

This invention has its object to provide an interlayer film for laminated glass an interlayer film for laminated glass which, when assembled into laminated glass, offers good transparency, weathering resistance, adhesion, penetration resistance and other characteristics, does not cause marginal whitening of laminated glass even exposed to a highly humid atmosphere, and free from the risk for a fire hazard in autoclaving or the problem associated with edge trimming and a laminate glass comprising said interlayer film.

This invention is related to an interlayer film for laminated glass comprising a plasticized poly(vinyl acetal) resin film, wherein, when a laminated glass fabricated by interposing said interlayer film between a pair of glass sheets each 2.0 to 4.0 mm thick is allowed to sit in an environment of 80° C. and 95% relative humidity for 2 weeks, the distance of whitening from its edge is not greater than 7 mm, and when said interlayer film for laminated glass is allowed to sit at 150° C. for 1 hour, its weight loss is not greater than 3 weight %.

7 Claims, No Drawings

INTERMEDIATE FILM FOR LAMINATED GLASS AND LAMINATED GLASS

TECHNICAL FIELD

The present invention relates to an interlayer film for laminated glass characterized by high moisture resistance and small plasticizer vapor emanation, and a laminated glass in which said interlayer film is used.

BACKGROUND ART

Laminated glass comprising at least two glass sheets with a plasticized poly(vinyl acetal) resin interlayer film interposed has the fundamental characteristics required of laminated glass, namely good transparency, high weathering resistance, and high penetration resistance scarcely allowing its fragments to scatter and, as such, has been used extensively as the laminated glass for automotive and architectural use.

Although such laminated glass is satisfactory in said fundamental characteristics and safety, it is not only poor in moisture resistance but has the drawback of emanating a substantial amount of vapor due to the plasticizer contained.

With regard to moisture resistance, the problem is that, when such laminated glass is put to use in a highly humid atmosphere, its interlayer film, exposed at its peripheral edge to the surrounding atmosphere, causes whitening in its marginal area of the interlayer film.

As an attempt to reduce such marginal whitening of laminated glass in case of setting it in a highly humid environment, Japanese Kokai Publication Hei-7-41340 discloses an "interlayer film for laminated glass which comprises a resin composition comprising a poly(vinyl acetal) resin, a plasticizer, a metal carboxylate and a straight-chain fatty acid".

The laminated glass containing the above interlayer film for laminated glass has been improved in reducing said marginal whitening after a moisture resistance test but the effect is not fully satisfactory. Moreover, reducing the addition amount of the metal salt results in improved resistance to said whitening but causes a reduction in penetration resistance.

In addition, the recent deployment of the laminated glass interlayer film in such applications as automotive side glass and the increasing trend toward the open-edge construction of front glass are imposing a greater emphasis on the moisture resistance of laminated glass.

Furthermore, while dihexyl adipate, triethylene glycol di-2-ethylbutyrate or the like is generally used as the plasticizer for the laminated glass interlayer film, these plasticizers are so low-boiling that they are liable to be evaporated and tend to present the risk for a fire hazard associated with autoclaving in the course of production of the interlayer film and the difficulties in edge trimming after autoclaving. Therefore, the switch-over to plasticizers having higher boiling points is demanded.

SUMMARY OF THE INVENTION

In view of the above state of the art, the present invention has for its object to provide an interlayer film for laminated glass which, when assembled into laminated glass, offers good transparency, weathering resistance, adhesion, penetration resistance and other characteristics, does not cause marginal whitening of laminated glass even exposed to a highly humid atmosphere, and free from the risk for a fire hazard in autoclaving or the problem associated with edge trimming and a laminate glass comprising said interlayer film.

The present invention, therefore, is concerned with an interlayer film for laminated glass comprising a plasticized poly(vinyl acetal) resin film, wherein, when a laminated glass fabricated by interposing said interlayer film for laminated glass between a pair of glass sheets each 2.0 to 4.0 mm thick is allowed to sit in an environment of 80° C. and 95% relative humidity for 2 weeks, the distance of whitening from its edge is not greater than 7 mm, and when said interlayer film for laminated glass is allowed to sit at 150° C. for 1 hour, its weight loss is not greater than 3 weight %.

DETAILED DESCRIPTION OF THE INVENTION

The present invention is now described in detail.

The interlayer film for laminated glass according to the present invention is such that, when a laminated glass comprising it is allowed to sit in an environment of 80° C. and 95% RH for 2 weeks, the distance of whitening from its edge is not greater than 7 mm. If the limit of 7 mm is exceeded, the whitening tends to progress further to affect the moisture resistance of the laminated glass so that the above limit is critical. The term "edge" is used herein with reference to the side closest to whitening of the four sides of the laminated glass.

The weight loss of said interlayer film for laminated glass which occurs, when it is allowed to sit at 150° C. for 1 hour, should not be greater than 3 weight %. If this limit of 3 weight % is exceeded, the risk for a fire hazard at autoclaving tends to become high and the edge trimming after autoclaving will become difficult. Therefore, the above limit is critical.

Insofar as it comprises a plasticized poly(vinyl acetal) resin film, the interlayer film for laminated glass of the present invention is not particularly restricted. However, if a metal salt is added at a large amount for the purpose of improving the penetration resistance of laminated glass, the moisture resistance of the glass will be considerably decreased. In this connection, the use of at least two kinds of salts selected from the group consisting of magnesium salts of carboxylic acids containing 2 to 10 carbon atoms and potassium salts of carboxylic acids containing 2 to 10 carbon atoms contributes to improved moisture resistance while securing the penetration resistance at low amounts of addition.

Moreover, by using triethylene glycol di-2-ethylhexanoate, oligo-ethylene glycol di-2-ethylhexanoate or tetraethylene glycol-di-n-heptanoate as the plasticizer for the interlayer film for laminated glass, said risk for a fire hazard in autoclaving and difficulties in edge trimming can be remarkably obviated. Therefore, the interlayer film for laminated glass of the present invention is preferably a plasticized poly(vinyl acetal) resin film comprising 100 weight parts of a poly(vinyl acetal) with an average acetalization degree of 66 to 72 mole % and 30 to 50 weight parts of at least one plasticizer selected from the group consisting of triethylene glycol di-2-ethylhexanoate, oligoethylene glycol di-2-ethylhexanoate and tetraethylene glycol di-n-heptanoat, and being supplemented with at least two kinds of salts selected from the group consisting of magnesium salts of carboxylic acids containing 2 to 10 carbon atoms and potassium salts of carboxylic acids containing 2 to 10 carbon atoms in a total concentration of not less than 5 ppm. If the salt content is less than 5 ppm, the bond strength control effect may not be sufficient, while an excessively high salt content may detract from moisture resistance.

While the poly(vinyl acetal) mentioned above is obtainable by acetalization of polyvinyl alcohol, the particularly preferred resin is poly(vinyl butyral) which is obtainable by butyralization of polyvinyl alcohol.

The technology of acetalizing polyvinyl alcohol to provide poly(vinyl acetal) includes a method which comprises dissolving polyvinyl alcohol in warm water, adding the necessary acid catalyst and aldehyde while the aqueous solution is maintained at a predetermined temperature, for example 0 to 95° C., and allowing the acetalization reaction to go to completion with constant stirring and subjecting the reaction product to neutralization, aqueous washing and drying to provide powders of poly(vinyl acetal) resin.

The polyvinyl alcohol mentioned above preferably has an average polymerization degree of 500 to 5000 and more preferably 1000 to 2500. If the average degree of polymerization is less than 500, the laminated glass fabricated with the interlayer film for laminated glass tends to be low in penetration resistance. On the other hand, if the average degree of polymerization exceeds 5000, the formation of an interlayer film for laminated glass tends to become difficult and, in addition, the strength of the interlayer film for laminated glass will become too great in some instances.

The poly(vinyl acetal) mentioned above comprises a vinyl acetal fraction, a vinyl alcohol fraction and a vinyl acetate fraction. The proportions of the respective fractions can be ascertained in accordance with JIS K6728 "Test Methods for Polyvinyl butyral" or based on the infrared absorption spectrometric (IR) data.

When said poly(vinyl acetal) is a polyvinyl acetal other than poly(vinyl butyral), the amount of the particular vinyl acetal can be found by measuring the vinyl alcohol content and vinyl acetate content and subtracting the combined content from 100.

The vinyl acetate content of said poly(vinyl acetal) is preferably not greater than 30 mole % and, for this purpose, a polyvinyl alcohol having a saponification degree of not less than 70 mole % is used with advantage. If the saponification degree of polyvinyl alcohol is less than 70 mole %, the transparency and heat resistance of the product poly (vinyl acetal) tends to be decreased and, in addition, the reactivity may at times be sacrificed.

The average polymerization degree and saponification degree of polyvinyl alcohol can be measured typically in accordance with JIS K6726 "Test Methods for Polyvinyl Alcohol". The average acetalization degree of the poly(vinyl acetal) obtained in the above manner is preferably 66 to 72 mole %. If the average acetalization degree is less than 66 mole %, the compatibility with the plasticizer tends to be decreased. On the other hand, if the upper limit of 72 mole % is exceeded, the dynamic properties necessary to impart a sufficient penetration resistance to laminated glass may not be obtained.

The above interlayer film for laminated glass contains at least one plasticizer selected from the group consisting of triethylene glycol di-2-ethylhexanoate, oligoethylene glycol di-2-ethylhexanoate and tetraethylene glycol di-n-heptanoate.

The triethylene glycol di-2-ethylhexanoate mentioned above can be prepared by reacting triethylene glycol with at least two molar equivalents of 2-ethylhexylic acid in the presence of a catalyst.

The oligoethylene glycol di-2-ethylhexanoate mentioned above can be obtained by reacting oligoethylene glycol with two or more molar equivalents of 2-ethylhexylic acid in the presence of a catalyst.

The oligoethylene glycol mentioned above is preferably such that molecules containing 3 to 9 ethylene glycol units account for not less than 90 weight %, and commercial products satisfying this requirement are available from Mitsui Toatsu Chemicals, Mitsubishi Chemical and Nisso Chemical Co., Ltd. among others.

The tetraethylene glycol di-n-heptanoate can be obtained by reacting tetraethylene glycol with 2 or more molar equivalents of n-heptanoic acid in the presence of a catalyst.

The formulating amount of said plasticizer with respect to poly(vinyl acetal) is preferably 30 to 50 weight parts to 100 weight parts of the poly(vinyl acetal). If the proportion of the plasticizer is less than 30 weight parts, the trimming characteristics of the product interlayer film for laminated glass will not be satisfactory. On the other hand, if the plasticizer is formulated in a proportion of more than 50 weight parts, it tends to bleed out to cause poor adhesion to glass.

In addition to said plasticizer, the interlayer film for laminated glass contains at least two salts selected from the group consisting of magnesium salts of carboxylic acids containing 2 to 10 carbon atoms and potassium salts of carboxylic acids containing 2 to 10 carbon atoms. These salts are intended to act as bond strength control agents.

When the bond strength between interlayer film and glass is too weak, fragments of the glass destroyed by an external impact or other force are peeled off from the interlayer film and scattered to injure the human body or the like. On the other hand, when the bond strength between interlayer film and glass is too high, the glass and interlayer film are simultaneously destroyed by an external impact or other force and fragments of the glass and interlayer film are scattered to injure the human body or the like. Therefore, the bond strength must be judiciously controlled. The combination use of said two kinds of salts enables adjustment of bond strength at a low addition amount and contributes further to the moisture resistance of the product interlayer film for laminated glass.

In using said two or more kinds of salts selected from the group consisting of magnesium salts of carboxylic acids containing 2 to 10 carbon atoms and potassium salts of carboxylic acids containing 2 to 10 carbon atoms in combination, the salts forming the combination may both be magnesium salts or potassium salts or one of the salts may be a magnesium salt and the other a potassium salt.

The total amount of said two or more kinds of salts selected from the group consisting of magnesium salts of carboxylic acids containing 2 to 10 carbon atoms and potassium salts of carboxylic acids containing 2 to 10 carbon atoms in the interlayer film for laminated glass is preferably not less than 5 ppm. If the salt content is less than 5 ppm, the interlayer film for laminated glass is not easy to be controlled in bond strength as desired. The more preferred salt content is 10 to 150 ppm. If the salt content exceeds 150 ppm, the interlayer film tends to be low in moisture resistance.

Where necessary, the interlayer film for laminated glass according to the present invention may be supplemented with those additives which are conventionally incorporated in an interlayer film for laminated glass of this kind, such as the ultraviolet absorber, light stabilizer, oxidation inhibitor, surfactant, colorant and so on.

The ultraviolet absorber mentioned above is not particularly restricted but includes benzotriazole series UV absorbers, such as Tinuvin® P, Tinuvin® 320, Tinuvin® 326 and Tinuvin® 328, all available from Ciba-Geigy, among others. These UV absorbers can be used alone or in combination.

The light stabilizer mentioned above is not particularly restricted but includes hindered amine series stabilizers, among others. Specifically, Adeka Stab® LA-57 from Asahi Denka Kogyo K.K. can be mentioned as an example. Such light stabilizers may be used alone or in combination.

The oxidation inhibitor mentioned above is not particularly restricted but includes phenolic antioxidants, such as Sumiliser® BHT from Sumitomo Chemical Co. Ltd., and Irganox® 1010 from Ciba-Geigy. Such oxidation inhibitors can be used alone or in combination.

The production technology for said interlayer film for laminated glass is not particularly restricted. However, a typical method may comprise formulating said poly (vinyl acetal) with said plasticizer and said at least two salts selected from the group consisting of magnesium salts of carboxylic acids containing 2 to 10 carbon atoms and potassium salts of carboxylic acids containing 2 to 10 carbon atoms, optionally further with appropriate amounts of various additives, compounding the mixture uniformly, and forming the resulting compound into a plasticized poly(vinyl acetal) resin film by extrusion, calendering, press-forming, casting or inflation-molding to provide the objective interlayer film for laminated glass.

The above interlayer film for laminated glass may be used either as a single-layer film or in the form of a two- or multiple-layer laminate.

The total thickness of such interlayer film for laminated glass is not particularly restricted but in consideration of the penetration resistance and weathering resistance usually required of laminated glass, the thickness of the film is preferably 0.3 to 1.6 mm and more preferably 0.3 to 0.8 mm.

The laminated glass according to the present invention comprises said interlayer film interposed between a pair of glass sheets.

The glass sheet is not particularly restricted but includes inorganic transparent sheet glass inclusive of float glass, polished glass, figured glass, wire-mesh glass, wire-line glass, heat-absorbing glass, tinted glass, etc. and organic transparent glass sheets such as polycarbonate sheet, poly (methyl methacrylate) sheet and so on.

These inorganic transparent sheet glass and organic transparent sheet glass may be used alone or in a combination of two or more species. Moreover, laminates of inorganic transparent sheet glass and organic transparent sheet glass may also be employed.

The thickness of said sheet glass is not particularly restricted but can be judiciously selected according to the intended use.

The production technology for said laminated glass is not particularly restricted. A typical method comprises interposing said interlayer film between a pair of transparent glass sheets, placing the assembly in a rubber bag, carrying out preliminary bonding at a temperature of about 70 to 110 ° C. under reduced pressure and performing post-bonding in an oven at a temperature of about 120 to 150 ° C. and a pressure of about 10 to 15 kg/cm² to provide the objective laminated glass.

BEST MODE FOR CARRYING OUT THE INVENTION

The following examples illustrate the present invention in further detail, are by no means limitative of the scope of the invention.

EXAMPLE 1

(1) Synthesis of Poly(Vinyl Butyral)

In 2890 g of purified water was dissolved 275 g of a polyvinyl alcohol having an average polymerization degree of 1700 and a saponification degree of 99.2 mole % with heating. After the temperature of the reaction system was adjusted to 15 ° C., 201 g of 35 weight % hydrochloric acid and 157 g of n-butyraldehyde were added and the mixture was maintained at the same temperature to let the reaction product separate out. Thereafter, the reaction system was maintained at 60° C. for 3 hours to carry the reaction to completion. This reaction mixture was washed with an excess of water to wash out the unreacted n-butyraldehyde and the hydrochloric acid catalyst was neutralized with the common neutralizer aqueous sodium hydroxide solution. The reaction product was rinsed with an excess of water for 2 hours and then dried to provide a white powder of poly(vinyl butyral). The average butyralization degree of this poly(vinyl butyral) was 68.5 mole %.

(2) Production of an Interlayer Film for Laminated Glass

First, 100 weight parts of the poly(vinyl butyral) obtained above was formulated with 39 weight parts of triethylene glycol di-2-ethylhexanoate. Then, magnesium acetate and magnesium 2-ethylbutyrate were added at the final concentrations of 20 ppm and 40 ppm, respectively. The mixture was thoroughly melt-kneaded with a mixing roll and, using a forming press, the resulting compound was hot-pressed at 150 ° C. for 30 minutes to provide an interlayer film for laminated glass having an average thickness of 0.76 mm.

(3) Fabrication of a Laminated Glass

The interlayer film for laminated glass obtained above was interposed between a pair of transparent float glass sheets (30 cm long×30 cm wide×3 mm thick), placed in a rubber bag and degassed in a vacuum of 20 Torr for 20 minutes. The assembly was transferred in degassed state to an oven, in which it was pressed in vacuum at 90 ° C. for 30 minutes. The preliminary laminate thus obtained was further pressed in an oven at 135 ° C. and 12 kg/cm² for 20 minutes to provide a laminated glass. This laminate glass was evaluated by the following evaluation methods. The results are shown in Table 2.

EVALUATION METHODS

1. Pummel Value

The adhesion of the interlayer film to the glass was evaluated in terms of pummel value. Thus, the laminate glass was allowed to sit at a temperature of −18±0.6 ° C. for 16 hours and, then, crushed with a hammer having a head weighing 0.45 kg until the glass fragments would become 6mm or less in diameter. The degree of exposure of the film after partial exfoliation of glass was estimated by comparison with graded limit samples and the result was expressed in pummel value according to the schedule shown below in Table 1. It is to be understood that the larger the pummel value is, the higher is the degree of adhesion to glass and the smaller the pummel value is, the lower is the degree of adhesion to glass.

TABLE 1

| Degree of exposure of films (%) | Pummel value |
|---|---|
| 100 | 0 |
| 90 | 1 |
| 85 | 2 |
| 60 | 3 |

TABLE 1-continued

| Degree of exposure of films (%) | Pummel value |
|---|---|
| 40 | 4 |
| 20 | 5 |
| 10 | 6 |
| 5 | 7 |
| ≦2 | 8 |

2. Moisture Resistance

The laminated glass was allowed to sit in an environment of 80° C. and 95% RH for 2 weeks and immediately after withdrawal from the environment, the distance of whitening from each peripheral edge was measured.

3. Volatility of the Plasticizer Contained in the Interlayer Film (Weight Loss on Heating)

The interlayer film was allowed to sit in an oven at 150° C. for 1 hour. The sheet was weighed before and after heating and the weight loss (weight %) was calculated from the weight data.

EXAMPLE 2

Except that, as bond strength control agents, potassium acetate and magnesium 2-ethylbutyrate were added at final concentrations of 70 ppm and 20 ppm, respectively, the procedure of Example 1 was faithfully followed to fabricate a laminated glass and evaluate it. The results are shown in Table 2.

EXAMPLE 3

Except that, as bond strength control agents, magnesium acetate and magnesium 2-ethylhexylate were added at final concentrations of 20 ppm and 60 ppm, respectively, the procedure of Example 1 was faithfully followed to fabricate a laminated glass and evaluate it. The results are shown in Table 2.

EXAMPLE 4

Except that oligoethylene glycol di-2-ethylhexanoate (average glycol chain: 3.8) was used in lieu of triethylene glycol di-2-ethylhexanoate, the procedure of Example 1 was faithfully followed to fabricate a laminated glass and evaluate it. The results are shown in Table 2.

EXAMPLE 5

Except that tetraethylene glycol di-n-heptanoate was used in lieu of triethylene glycol di-2-ethylhexanoate, the procedure of Example 1 was faithfully followed to fabricate a laminated glass and evaluate it. The results are shown in Table 2.

EXAMPLE 6

Except that, as the bond strength control agent, magnesium 2-ethylbutyrate was added at a final concentration of 4 ppm, the procedure of Example 1 was faithfully followed to fabricate a laminated glass and evaluate it. The results are shown in Table 2.

COMPARATIVE EXAMPLE 1

Except that dihexyl adipate (DHA) was used in lieu of triethylene glycol di-2-ethylhexanoate, the procedure of Example 1 was faithfully followed to fabricate a laminated glass and evaluate it. The results are shown in Table 2.

COMPARATIVE EXAMPLE 2

Except that, as the bond strength control agent, potassium acetate alone was added at a final concentration of 80 ppm, the procedure of Example 1 was faithfully followed to fabricate a laminated glass and evaluate it. The results are shown in Table 2.

TABLE 2

| | Pummel value | Distance of whitening (mm) | Weight loss on heating (%) |
|---|---|---|---|
| Example 1 | 3 | 2 | 2 |
| Example 2 | 3 | 2 | 2 |
| Example 3 | 3 | 2 | 2 |
| Example 4 | 3 | 5 | 2 |
| Example 5 | 3 | 5 | 2 |
| Example 6 | 8 | 2 | 2 |
| Compar. Ex. 1 | 3 | 2 | 8 |
| Compar. Ex. 2 | 3 | 15 | 2 |

INDUSTRIAL APPLICABILITY

The interlayer film for laminated glass according to the present invention, constituted as described above, provides a laminated glass with good transparency, weathering resistance, adhesion, penetration resistance, etc., does not cause any appreciable whitening of the laminate in its marginal area even in a highly humid environment, and because of reduced plasticizer evaporation, has a reduced risk for fire hazards associated with autoclaving. Moreover, it provides for neat edge trimming.

The laminated glass of the present invention, constituted as described above, is excellent in the fundamental qualities required of laminated glass, such as transparency, weathering resistance, adhesion and penetration resistance and is less liable to show whitening in its marginal area even when it is used in a highly humid environment.

What is claimed is:

1. An interlayer film for laminated glass comprising a plasticized poly(vinyl acetal) resin film, wherein, when a laminated glass fabricated by interposing said interlayer film for laminated glass between a pair of glass sheets each 2.0 to 4.0 mm thick is allowed to sit in an environment of 80° C. and 95% relative humidity for 2 weeks, the distance of whitening from its edge is not greater than 7 mm, and when said interlayer film for laminated glass is allowed to sit at 150° C. for 1 hour, its weight loss is not greater than 3 weight %, wherein the plasticized poly(vinyl acetal) resin film comprises 100 weight parts of a poly(vinyl acetal) having an average acetalization degree of 66 to 72 mole % and 30 to 50 weight parts of oligoethylene glycol di-2-ethylhexanoate as a plasticizer, and is supplemented with at least two kinds of salts selected from the group consisting of magnesium salts of carboxylic acids containing 2 to 10 carbon atoms and potassium salts of carboxylic acids containing 2 to 10 carbon atoms in a total concentration of not less than 5 ppm.

2. The interlayer film for laminated glass according to claim 1 wherein the salt content is 10 to 150 ppm.

3. The interlayer film for laminated glass according to claim 1
wherein the poly(vinyl acetal) is a poly(vinyl butyral) having an average butyralization degree of 66 to 72 mole %.

4. The interlayer film for laminated glass according to claim 3,
wherein the salt content is 10 to 150 ppm.

5. A laminated glass which comprises the interlayer film for laminated glass according to claim 1.

6. A laminated glass which comprises the interlayer film for laminated glass according to claim 2.

7. A laminated glass which comprises the interlayer film for laminated glass according to claim 3.

* * * * *

UNITED STATES PATENT AND TRADEMARK OFFICE
CERTIFICATE OF CORRECTION

PATENT NO. : 6,383,647 B1  
DATED : May 7, 2002  
INVENTOR(S) : Hajime Shohi, Tsuyoshi Hattori and Jiro Miyai It is certified that error appears in the above-identified patent and that said Letters Patent is hereby corrected as shown below:

<u>Title page,</u>
Item [22], the PCT filing date should read:

-- [22] PCT Filed: Sep. 30, 1999 --

Signed and Sealed this

Eighteenth Day of March, 2003

JAMES E. ROGAN
*Director of the United States Patent and Trademark Office*